(12) United States Patent
Higashida et al.

(10) Patent No.: US 9,638,979 B2
(45) Date of Patent: May 2, 2017

(54) LIGHT CONTROL FILM

(75) Inventors: Osamu Higashida, Hitachi (JP); Michio Ogawa, Hitachi (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 12/520,315

(22) PCT Filed: Dec. 21, 2007

(86) PCT No.: PCT/JP2007/074750
§ 371 (c)(1),
(2), (4) Date: Jun. 19, 2009

(87) PCT Pub. No.: WO2008/075774
PCT Pub. Date: Jun. 26, 2008

(65) Prior Publication Data
US 2010/0047593 A1    Feb. 25, 2010

(30) Foreign Application Priority Data
Dec. 21, 2006   (JP) ................. 2006-344178

(51) Int. Cl.
*G02F 1/17* (2006.01)
*G02F 1/1334* (2006.01)

(52) U.S. Cl.
CPC ............ *G02F 1/172* (2013.01); *G02F 1/1334* (2013.01); *Y10T 428/31663* (2015.04); *Y10T 428/31786* (2015.04)

(58) Field of Classification Search
None
See application file for complete search history.

(56) References Cited

U.S. PATENT DOCUMENTS

| | | | |
|---|---|---|---|
| 2,041,138 A | 5/1936 | Land | |
| 2,306,108 A | 12/1942 | Land et al. | |
| 2,375,963 A | 5/1945 | Thomas | |
| 3,773,684 A * | 11/1973 | Marks | ........................... 252/583 |
| 4,270,841 A | 6/1981 | Saxe | |

(Continued)

FOREIGN PATENT DOCUMENTS

| | | | |
|---|---|---|---|
| GB | 433455 | 8/1935 | |
| JP | 04086807 A * | 3/1992 | ........... G02F 1/1333 |

(Continued)

OTHER PUBLICATIONS

Machine translation of JP 2002-189123 (May 7, 2002).*

(Continued)

*Primary Examiner* — Kenneth Stachel
(74) *Attorney, Agent, or Firm* — Fitch, Even, Tabin & Flannery, LLP

(57) ABSTRACT

The present invention relates to a light control film, comprising:
two transparent electroconductive substrates; and
a light control layer sandwiched between the two transparent electroconductive substrates,
wherein the light control layer contains a resin matrix and a light control suspension dispersed in the resin matrix, and the concentration of the light control suspension in the vicinity of each of the transparent electroconductive substrates is smaller than that of the light control suspension in the middle in the thickness direction of the light control layer.

18 Claims, 3 Drawing Sheets

(56) References Cited

U.S. PATENT DOCUMENTS

| | | | |
|---|---|---|---|
| 4,422,963 A | 12/1983 | Thompson et al. | |
| 5,728,251 A | 3/1998 | Check, III | |
| 6,114,405 A * | 9/2000 | Zhuang et al. | 522/99 |
| 6,515,649 B1 * | 2/2003 | Albert et al. | 345/107 |
| 6,620,342 B1 * | 9/2003 | Burchill et al. | 252/511 |
| 2005/0151908 A1 * | 7/2005 | Nomura et al. | 349/136 |
| 2005/0227061 A1 * | 10/2005 | Slovak et al. | 428/323 |
| 2006/0227196 A1 | 10/2006 | Zhou | |
| 2007/0058114 A1 * | 3/2007 | Niiyama et al. | 349/106 |

FOREIGN PATENT DOCUMENTS

| | | |
|---|---|---|
| JP | 05-011283 | 1/1993 |
| JP | 06-118452 | 4/1994 |
| JP | 06-167700 | 6/1994 |
| JP | 09-113939 | 5/1997 |
| JP | 11-218789 | 8/1999 |
| JP | 2002-189123 | 7/2002 |
| JP | 2002-214653 | 7/2002 |
| JP | 2006-064832 | 3/2006 |
| WO | WO 01/02899 | 1/2001 |

OTHER PUBLICATIONS

Machine translation of JP 2006-064832. (Sep. 3, 2006).*
English language abstract for JP04086807 (1992).*
English machine translation JP04086807 (IPDL) (JPO) (1992).*
English machine translation JP06167700 (IPDL) (JPO) (1994).*
Hawley's Condensed Chemical Dictionary, liquid crystal definition, Wiley (2007).*
EP Office Action of Appln. No. 07 85 9980 dated Nov. 6, 2009.
English Translation of International Preliminary Report on Patentability of International Appln. No. PCT/JP2007/074750 dated Jul. 2, 2009.
JP Office Action Appln. No. 2008-550202 dated Oct. 1, 2013 with English translation.

* cited by examiner (a)　　　　　　　　　　(b)

(a)  (b)

LIGHT CONTROL FILM

TECHNICAL FIELD

The present invention relates to a light control film. The present invention relates specifically to a light control film that is preferably used for a window pane, various flat display elements, alternate products of various liquid crystal display elements, a light shutter, display plates for advertisement and guide, eyeglasses, sunglasses and others.

BACKGROUND ART

Light control films are each a material that gives a light transmittance varied in accordance with whether or not an electric field is applied thereto, so as to be able to adjust the incident light amount. Known is, for example, a light control film being obtained by sandwiching a light control layer between transparent electroconductive substrates, the light control layer being obtained by dispersing a light control suspension in which a light control particles are dispersed, into a resin matrix, the light control particles responding to an electric field. This light control film is a film in which fine droplets of the light control suspension in which the light control particles are dispersed, are dispersed in the resin matrix, which is cured by irradiation with ultraviolet rays. In this light control film, the light control particles absorb, scatter or reflect light by Brownian motion in the state that no electric field is applied thereto; thus, incident light into the film cannot penetrate through the film. When an electric field is applied thereto, the light control particles are oriented in the direction parallel to the electric field by the polarization of the particles; thus, incident light to the film can penetrate through the film. In such a way, in a light control film, the amount of transmitted light is adjusted in accordance with the response of light control particles to an electric field (see Japanese Patent Application Laid-Open (JP-A) No. 11-218789).

In similar light control films, an investigation is made on a light control film wherein the total amount of incident light can be adjusted by adjusting the aspect ratio of light control particles, the light control particles are neither aggregated nor sedimented, and further a stable light control performance is exhibited (see JP-A No. 2002-214653). An investigation is also made on a light control film the size of droplets of a light control suspension dispersed in a resin matrix is adjusted, thereby making high contrast that is a difference between the transmittance in the state that an electric field is applied thereto and that in the state that no electric field is applied thereto, giving a low haze in the state that the electric field is applied thereto, and further giving a high switching speed (see JP-A No. 2006-064832).

DISCLOSURE OF THE INVENTION

However, in the case of applying these light control films to window panes for automobiles or buildings, which are exposed directly to sunlight, the films are insufficient for gaining a stable light control function with a low haze without having color unevenness. Thus, a further improvement has been desired. An object of the present invention is to provide a light control film that is low in haze and excellent in adhesive property and thermal stability without having color unevenness.

The inventors have made eager investigations to find out that the above-mentioned problems can be solved by making the concentration of a light control suspension dispersed in the vicinity of each of transparent electroconductive substrates smaller than that of the light control suspension in the middle in the thickness direction of the light control layer.

Accordingly, the present invention relates to a light control film including two transparent electroconductive substrates and a light control layer sandwiched between the two transparent electroconductive substrates, wherein the light control layer contains a resin matrix and a light control suspension dispersed in the resin matrix, and the concentration of the light control suspension in the vicinity of each of the transparent electroconductive substrates is smaller than that of the light control suspension in the middle in the thickness direction of the light control layer.

In an embodiment of the light control film of the present invention, the light control layer preferably has therein no interfacial surface.

In an embodiment of the light control film of the present invention, the resin matrix may be formed by use of a polymeric medium, and the polymeric medium preferably contains a silicone resin having a substituent having an ethylenically unsaturated bond, and a photopolymerization initiator.

In an embodiment of the light control film of the present invention, the light control suspension preferably contains an acrylic acid ester oligomer having a fluoro group and a hydroxyl group.

The disclosure of the present application is related to the subject matter described in Japanese Patent Application No. 2006-344178 filed on Dec. 21, 2006, and the contents disclosed therein are incorporated herein by reference.

BEST MODE FOR CARRYING OUT THE INVENTION

Figure 1:
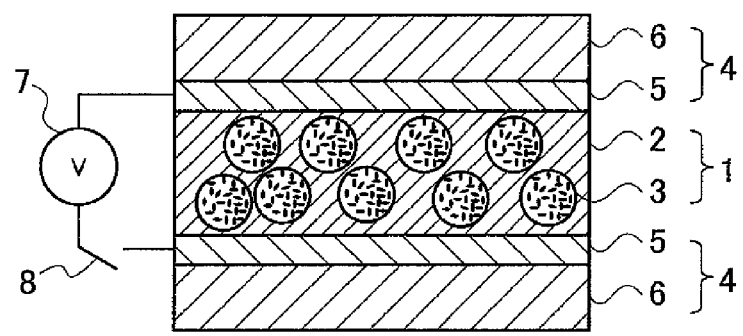
FIG. 1 is a schematic view of a sectional structure of an embodiment of the light control film of the present invention.

The light control film of the present invention has two transparent electroconductive substrates and a light control layer sandwiched between the two transparent electroconductive substrates. The light control layer contains a resin matrix and a light control suspension dispersed in the resin matrix. The light control film of the present invention is characterized in that in any cross section in the thickness direction of the light control film, the concentration of the light control suspension dispersed in the vicinity of each of the transparent electroconductive substrates is smaller than that of the light control suspension dispersed in the middle in the cross section of the light control layer.

When droplets having a light control performance and made from a light control suspension are dispersed in a resin matrix, the droplets may be unified. At this time, the resin matrix and other components around the droplets are easily taken into the droplets. The taken-in components, such as the resin matrix, hinder the movement of the light control particles in the formed droplets to cause a fall in the light control function or a fall in the adhesion between the light control layer and the transparent electroconductive substrates. This phenomenon becomes remarkable, in particular, in the vicinity of each of the transparent electroconductive substrates. According to the present invention, the concentration of a light control suspension in the vicinity of each of two transparent electroconductive substrates is made small, whereby a light control film excellent in light control performance and adhesive property can be obtained.

The light control layer in the present invention is a layer wherein droplets made from a light control suspension and having light control performance are dispersed in a resin matrix. The light control suspension contains a dispersing medium and light control particles dispersed in the dispersing medium. In the state that no electric field is applied to the light control film, the light control particles floated and dispersed in a flowing state in the droplets absorb, scatter or reflect light by Brownian motion; thus, light radiated into the film can hardly penetrate through the film. However, when an electric field is applied to the light control film, the light control particles are arranged in the direction parallel to the electric field since the light control particles have electric dipole moment; thus, light radiated into the film comes to penetrate through the film. In this way, the light control particles respond to the applied electric field, whereby the amount of transmitted light comes to be adjustable.

Examples of the light control particles in the present invention include inorganic fibers such as a polyiodide, carbon fiber and carbon nanofiber, carbon nanotube, metal-free phthalocyanine, and a metal phthalocyanine having, as its central metal, copper, nickel, iron, cobalt, chromium, titanium, beryllium, molybdenum, tungsten, aluminum, chromium or the like. The use of a polyiodide is particularly preferred.

The polyiodide may be a polyiodide produced by causing iodine and a iodide to react with a material selected from the group consisting of pyrazine-2,3-dicarboxylic acid dihydrate, pyrazine-2,5-dicarboxylic acid dihydrate, and pyridine-2,5-dicarboxylic acid monohydrate. The thus-obtained polyiodide is, for example, a polyiodide represented by the following general formula:

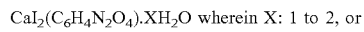
$CaI_2(C_6H_4N_2O_4)\cdot XH_2O$ wherein X: 1 to 2, or

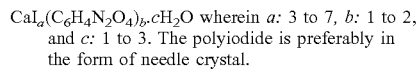
$CaI_a(C_6H_4N_2O_4)_b\cdot cH_2O$ wherein a: 3 to 7, b: 1 to 2, and c: 1 to 3. The polyiodide is preferably in the form of needle crystal.

For the light control particles, the following compounds may be used: compounds disclosed in, for example, specifications of U.S. Pat. No. 2,041,138 (E. H. Land), U.S. Pat. No. 2,306,108 (Land et al.), U.S. Pat. No. 2,375,963 (Thomas), U.S. Pat. No. 4,270,841 (R. L. Saxe), GB Patent No. 433,455, and others. The compounds disclosed therein are each produced by selecting one from pyrazinecarboxylic acid and pyridinecarboxylic acid, causing the selected acid to react with iodine, chlorine or bromine, thereby converting the acid to a polyhalide such as a polyiodide, polychloride or polybromide. The polyhalide is a complex compound obtained by a reaction between a halogen atom and an inorganic or organic material. Detailed production processes thereof are disclosed in, for example, U.S. Pat. No. 4,422,963 (Saxe).

In the step of synthesizing the light control particles, it is preferred to use a polymeric material such as nitrocellulose in order to form particles having uniform sizes and improve the dispersibility of the particles in the light control suspension. By the use of the polymeric material, such as nitrocellulose, at the time of dispersing the light control suspension in the form of fine droplets in the resin matrix, which is in a solid form, the light control particles are easily dispersed or floated into the fine droplets so that the responsibility to an electric field tends to be improved.

The aspect ratio of the light control particles in the present invention is preferably from 6 to 15 since the responsibility of the light control particles to an electric field is improved and further the light control particles are excellent in contrast that is a difference between the transmittance in the state that no electric field is applied thereto and the transmittance in the state that an electric field is applied thereto. The aspect ratio is more preferably more than 7 and 12 or less, even more preferably from 7.5 to 11. If the aspect ratio of the light control particles is more than 15, the haze (cloudiness) through the naked eye tends to become large and to cause a gritty feeling. Moreover, the following properties fall: the responsibility of the light control particles to an electric field; the light transmittance at the time of applying an electric field to the film; and the transparency of the film at the same time. On the other hand, if the aspect ratio is less than 6, the contrast tends to fall. Additionally, the responsibility of the light control particles to a low-frequency electric field tends to be deteriorated.

The aspect ratio can be obtained by photographing the light control particles with an electron microscope such as a scanning electron microscope or a transmission electron microscope, extracting 50 particles out of the light control particles arbitrarily from the photographed image, calculating the ratio between the major axis and the minor axis (the ratio of the major axis/the minor axis) of each of the light control particles, and then calculating out the average of the resultant ratios. The major axis referred to herein denotes the length of the longest diameter about each of the light control particles projected into a two-dimensional visual field through the photographed image. The minor axis is defined as the length of the longest diameter orthogonal to the major diameter.

In the present invention, the major axis of the light control particles is preferably from 200 to 500 nm, more preferably from 250 to 450 nm, even more preferably from 300 to 400 nm. The minor axis of the light control particles is preferably from 30 to 90 nm, more preferably from 40 to 70 nm, even more preferably from 50 to 70 nm.

The aspect ratio of the light control particles can be adjusted by conducting appropriately the adjustment of the particle diameters through a mechanical treatment such as pulverization or classification, the adjustment of the particle diameter distribution through removal of fine particles or coarse particles by centrifugation, or some other operation. The aspect ratio can also be adjusted by adjusting conditions for producing the light control particles appropriately, adjusting the particle diameter or the particle diameter distribution of raw materials of the light control particles appropriately, or conducting some other operation.

The light control layer in the present invention contains a resin matrix, and a light control suspension dispersed in the resin matrix. The light control layer can be formed by use of, for example, a light control material containing a polymeric medium for forming the resin matrix and the light control suspension.

The polymeric medium for forming the resin matrix in the present invention is, for example, a polymeric composition containing a photopolymerization initiator, and a polymeric compound that is cured by effect of energy beam or rays such as ultraviolet rays, visible rays, an electron beam, or the like. The polymeric composition is, for example, a polymeric composition containing a polymeric compound having a substituent having an ethylenically unsaturated bond and a photopolymerization initiator.

The polymeric compound having a substituent having an ethylenically unsaturated bond is preferably silicone resin, acrylic resin, polyester resin or the like from the viewpoint of easiness of the synthesis, the light control performance and durability, and others. In the present invention, silicone resin is in particular preferably used. These resins preferably have the following substituent from the viewpoint of the light control performance, the durability, and others: an alkyl group such as a methyl, ethyl, propyl, isopropyl, butyl, isobutyl, tert-butyl, amyl, isoamyl, hexyl or cyclohexyl group, or an aryl group such as a phenyl or naphthyl group. Specific examples of the silicone resin include polymeric compounds described in Japanese Patent Application Publication (JP-B) No. 53-36515, JP-B No. 57-52371, JP-B No. 58-53656, and JP-B No. 61-17863.

The silicone resin is synthesized, for example, by subjecting the following compounds to dehydrogenating condensation reaction and dealcoholization reaction in the presence of tin 2-ethylhexane as an organic tin-based catalyst:

a siloxane polymer having a silanol group at each of double terminals thereof, such as silanol-both-terminated polydimethylsiloxane, silanol-both-terminated polydiphenylsiloxane/dimethylsiloxane copolymer or silanol-both-terminated polydimethyldiphenylsiloxane;

a trialkylalkoxysilane such as trimethylethoxysilane;

an ethylenically-unsaturated-bond-containing silane compound such as (3-acryloxypropyl)methyldimethoxysilane; and so on. The form of the resin is preferably a solvent-free form. In other words, when a solvent is used to synthesize the resin, it is preferred to remove the solvent after the synthesis reaction. The use amount of the ethylenically-unsaturated-bond-containing silane compound, such as (3-acryloxypropyl)methoxysilane, is preferably from 2 to 30% by weight of the whole of the siloxane and silane compounds as the raw materials, more preferably from 5 to 18% by weight thereof.

The acrylic resin can be yielded, for example, as follows: first, a main-chain-forming monomer, such as an alkyl ester (meth)acrylate, an aryl ester (meth)acrylate, benzyl (meth) acrylate or styrene, is copolymerized with a functional-group-containing monomer for introducing an ethylenically unsaturated bond, such as (meth)acrylic acid, hydroxylethyl (meth)acrylate, isocyanatoethyl (meth)acrylate or glycidyl (meth)acrylate, so as to synthesize a prepolymer once; next, a monomer for being caused to react with functional groups of this prepolymer is subjected to addition reaction with the prepolymer, examples of the monomer including glycidyl (meth)acrylate, isocyanatoethyl (meth)acrylate, hydroxyethyl (meth)acrylate and (meth)acrylic acid.

The above-mentioned polyester can easily be produced by a known method.

About these polymeric compounds which each has a substituent having an ethylenically unsaturated bond, the weight-average molecular weight in terms of polystyrene, which is obtained by gel permeation chromatography, is preferably within the range of 20,000 to 100,000, more preferably within the range of 30,000 to 80,000.

In the case of using the above-mentioned polymeric compound having a substituent having an ethylenically unsaturated bond, a photopolymerization initiator for activating radical polymerization by irradiation with an energy ray may be used. Specifically, the following may be used: 2,2-dimethoxy-1,2-diphenylethane-1-one, 1-(4-(2-hydroxyethoxy)phenyl)-2-hydroxy-2-methyl-1-propane-1-one, bis (2,4,6-trimethylbenzoyl)phenylphosphine oxide, 2-hydroxy-2-methyl-1-phenylpropane-1-one, (1-hydroxycycloheyxl)phenyl ketone, or the like.

The use amount of the photopolymerization initiator is preferably from 0.05 to 20 parts by weight, more preferably from 0.1 to 5 parts by weight relative to 100 parts by weight of the polymeric compound having a substituent having an ethylenically unsaturated bond.

It is allowable to use, besides the polymeric compound having a substituent having an ethylenically unsaturated bond, an organic-solvent soluble type resin or a thermoplastic resin together, examples of the resin including polyacrylic acid and polymethacrylic acid each having a weight-average molecular weight in terms of polystyrene within the range of 1,000 to 100,000, which is measured by gel permeation chromatography. To the polymeric medium may be added a coloration preventive as an additive, such as dibutyltin dilaurate if necessary. A solvent may be contained in the polymer medium if necessary.

In the present invention, the dispersing medium in the light control suspension fulfils a function of causing the light control particles to be dispersed therein in the state that the particles can flow. The dispersing medium is preferably a material which: adheres selectively to the light control particles; covers the light control particles; when a phase separation is caused between the dispersing medium and a polymeric medium, acts to cause the light control particles to be shifted into the droplet phase subjected to the phase separation; and neither has electroconductivity nor affinity with the polymeric medium. Furthermore, it is preferred to use a liquid copolymer having a refractive index similar to that of the resin matrix made from the polymeric medium when a light control film is finished. Preferred is, for example, a (meth)acrylic acid ester oligomer having a fluoro group and/or a hydroxyl group, and more preferred is a (meth)acrylic acid ester oligomer having a fluoro group and a hydroxyl group. Particularly preferred is an acrylic acid ester oligomer having a fluoro group and a hydroxyl group. When such a copolymer is used, any one monomer unit of the fluoro group and the hydroxyl group is directed to the light control particles and the other monomer unit acts to cause the light control suspension to be stably maintained as droplets in the polymeric medium. For this reason, the light control particles are easily dispersed in the light control suspension, and further at the time of the phase separation, the light control particles are easily derived into the droplets that undergo the phase separation. Examples of the (meth) acrylic acid ester oligomer having a fluoro group and/or a hydroxyl group include 2,2,2-trifluoroethyl methacrylate/ butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/ 2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, and 1H,1H,2H,2H-heptadecafluorodecyl methacrylate/butyl acrylate/2-hydroxyethyl acrylate copolymer. These (meth)acrylic acid ester oligomers more preferably have both of a fluoro group and a hydroxyl group.

About these (meth)acrylic acid ester oligomers, the weight-average molecular weight in terms of standard polystyrene, which is measured by gel permeation chromatography, is preferably within the range of 1,000 to 20,000, more preferably within the range of 2,000 to 10,000. The use amount of the fluoro-group-containing monomer which is a raw material for the (meth)acrylic acid ester oligomers is preferably from 6 to 12% by mole of the entire monomers as the raw materials thereof, more preferably from 7 to 8% by mole thereof. If the use amount of the fluoro-group-containing monomer is more than 12% by mole, the refractive index tends to be increased so that the light transmittance lowers. The use amount of the hydroxyl-group-containing monomer which is a raw material for the (meth)acrylic acid ester oligomers is preferably from 0.5 to 22.0% by mole of the entire monomers as the raw materials thereof, more preferably from 1 to 8% by mole thereof. If the use amount of the hydroxyl-group-containing monomer is more than 22.0% by mole, the refractive index tends to be increased so that the light transmittance lowers.

The light control suspension in the present invention contains the light control particles preferably in an amount of 1 to 70% by weight of the light control suspension, more preferably in an amount of 4 to 50% by weight thereof. The suspension also contains the dispersing medium preferably in an amount of 30 to 99% by weight of the light control suspension, more preferably in an amount of 50 to 96% by weight thereof.

The light control suspension is also contained in the polymeric medium preferably in an amount of 1 to 100 parts by weight, more preferably in an amount of 4 to 70 parts by weight, even more preferably in an amount of 6 to 60 parts by weight, in particular preferably in an amount of 8 to 50 parts by weight relative to 100 parts by weight of the polymeric medium.

The light control film of the present invention has a light control layer containing a resin matrix made from a polymeric medium, and a light control suspension dispersed in the resin matrix. The light control film of the present invention is formed by sandwiching the light control layer between transparent electroconductive substrates. The light control film of the present invention can be produced, for example by applying, onto a transparent electroconductive substrate, a light control material containing a polymeric medium for forming a resin matrix, and a light control suspension, radiating an energy beam thereto so as to cure the polymeric medium, thereby forming a light control layer, and then causing another transparent electroconductive substrate to adhere closely onto the light control layer.

As the process for producing the light control film of the present invention, for example, the following methods are given: (I) First, a liquid light control suspension is mixed with a polymeric medium into a homogeneous form. Next, the mixture is made to a mixed liquid (light control material) wherein the light control suspension is dispersed in the form of droplets in the polymeric medium. Furthermore, this mixed liquid is applied onto a transparent electroconductive substrate so as to have a certain thickness. If necessary, the solvent is dried and removed under a reduced pressure. Thereafter, a high-pressure mercury lamp or the like is used to radiate ultraviolet rays thereto, so as to cure the polymeric medium into an appropriate degree. In such a way, two light-control-layer-formed transparent electroconductive substrates are prepared, and the two substrates are caused to adhere onto each other. Furthermore, the curing is optionally promoted. Thus, the members are integrated into one unit, thereby producing the light control film.

(II) A mixed liquid as described above is prepared, and this mixed liquid is applied onto a transparent electroconductive substrate so as to have a certain thickness. If necessary, the solvent is dried and removed under a reduced pressure. Next, another transparent electroconductive substrate is caused to adhere onto the workpiece. Thereafter, a high-pressure mercury lamp or the like is used to radiate ultraviolet rays thereto, so as to cure the polymeric medium appropriately.

In any case where a film is used as each of the transparent electroconductive substrates, any one of the methods makes it possible to supply the transparent electroconductive substrate in the form of a film roll. When the transparent electroconductive substrates are each wound off from the roll, the above-mentioned operation is performed on the substrate to yield a light control film and then the film is wound around a different roll, the light control film having a homogeneous light control layer with a uniform film thickness, can be continuously produced.

In order to make the concentration of the light control suspension in the vicinity of each of the transparent electroconductive substrates smaller than that of the light control suspension in the middle in the thickness direction of the light control layer, the following methods are given: a method wherein at the time of radiating an energy beam to cure the polymeric medium, the energy beam is radiated thereinto from each of both the surfaces; a method of forming a layer made (only) of the polymeric medium, which will turn to a resin matrix, between each of the transparent electroconductive substrate and the light control layer; and other methods.

A measurement of the concentration (density) of the light control suspension can be made by observing a cross section in the thickness direction of the light control film, trisecting the light control layer into three equal parts consisting of the vicinity region of each of the transparent electroconductive substrates, and the middle region of the light control layer, and then observing the existence of droplets of the light control suspension in each of the regions.

The thickness of the light control layer is not particularly limited, and is preferably from 10 to 500 µm, more preferably from 20 to 100 µm. If the thickness of the light control layer becomes less than 10 µm, a short circuit tends to be easily caused and further the layer tends not to be easily laminated onto each of the transparent electroconductive substrates. On the other hand, if the thickness of the light control layer is more than 500 µm, the layer tends not to be easily cured by an energy beam. The light transmittance of the light control film can be adjusted by changing the mixing ratio between the polymeric medium, which will turn to a resin matrix, and the liquid light control suspension variously.

The light control layer is preferably a layer having therein no interfacial surface from the viewpoint of the light control performance, the durability of the film, and others. The layer having therein no interfacial surface can be produced by, for example, the above-mentioned method (II). According to the method (I), two light control layers are caused to adhere to each other, so that an interfacial surface can easily be formed therebetween. An interfacial surface in the light control layer means a face of a boundary between pieces of the resin matrix. Naturally, a face of a boundary between the resin matrix and the light control suspension may be present in the light control layer.

Examples of a usable method for dispersing the light control suspension in a droplet state into the polymeric resin or resin matrix include a method of mixing the light control suspension and the polymeric medium with each other so as to disperse the light control suspension finely by means of a homogenizer, an ultrasonic homogenizer or the like, a phase separation method depending on the polymerization of the resin component in the polymeric medium, a phase separation method depending on solvent-vaporization, and a phase separation method depending on temperature.

The method for applying the above-mentioned mixed liquid onto each of the transparent electroconductive substrates so that the mixed liquid can have a certain thickness includes, for example, a method using a applying means such as a bar coater, an applicator, a doctor blade, a roll coater, a die coater, or a comma coater. In the applying, the mixed liquid may be diluted with an appropriate solvent if necessary. In the case of using the solvent, the liquid is applied onto the substrate and subsequently the applying layer is dried. The solvent may be, for example, tetrahydrofuran, toluene, heptane, cyclohexane, ethyl acetate, ethanol, methanol, isoamyl acetate, or hexyl acetate.

The transparent electroconductive substrate may be, for example, a transparent substrate coated with a transparent electroconductive film of ITO, $SnO_2$, $In_2O_3$ or the like. The light transmittance of the transparent electroconductive film is preferably 80% or more, and the thickness of the transparent electroconductive film is preferably from 10 to 5,000 nm. The light transmittance can be measured in accordance with Measuring Method of Overall Light Ray Transmittance in JISK7105. For the transparent substrate, for example, glass or a polymeric film may be used.

The glass means a substrate transparent to visible rays and others. The glass may be an ordinary glass made mainly of silicon dioxide, a glass made of an inorganic material which may have various compositions, or a resin glass made of an organic material such as transparent acrylic resin or polycarbonate resin.

The above-mentioned polymeric film may be, for example, a film of a polyester such as polyethylene terephthalate, a film of a polyolefin such as polypropylene, a film of polyvinyl chloride or a polyacrylic resin, a polyethersulfone film, a polyarylate film, a polycarbonate film, or some other resin film. A polyethylene terephthalate film is preferred since the film is excellent in transparency, formability, adhesiveness, workability and others. The thickness of the transparent substrate is not particularly limited. In the case of the glass, the thickness is preferably from 1 to 15 mm. In the case of the polymeric film, the thickness is preferably from 10 to 200 μm.

The surface resistance value of the transparent electroconductive substrate is preferably from 3 to 600Ω. When a light control film is formed in the state that the interval between its electroconductive substrates is made narrow, it is allowable to use substrates each having a transparent electroconductive film and a transparent insulating layer formed on the film, the transparent insulating layer having a thickness of 200 to 1,000 Å in order to prevent a short circuit phenomenon generated by the incorporation of an alien substrate, or some other cause. In the case of forming a reflective light control window, such as a rear viewing mirror for automobiles, a thin film which is a reflecting body and is made of an electroconductive metal such as aluminum, gold or silver may be used directly as an electrode. The above-mentioned method makes it possible to form a light control film having a light transmittance adjustable arbitrarily through the formation of an electric field.

In the light control film, the size of droplets (average droplet diameter) of the light control suspension dispersed in the resin matrix is preferably from 0.5 to 50 μm, more preferably from 1 to 10 μm in order to prevent the aggregation and sedimentation of the light control particles. The average droplet diameter can be determined, for example, by using an optical microscope to take a photographic image or some other image of the light control film from one of the surface directions of the film, measuring the diameters of plural arbitrarily-selected droplets therein, and then calculating the average value thereof. The average droplet diameter may be also determined by taking a visual field image of the light control film obtained through an optical microscope, as digital data, into a computer, and then using an image processing integration software. The size of the droplets is decided dependently on the concentrations of the individual components which constitute the light control suspension, the viscosities of the light control suspension and the polymeric medium, the compatibility of the dispersing medium in the light control suspension with the polymeric medium, and others.

It is preferred that the refractive index of the light control suspension, which is in a liquid state, is close to that of the polymeric medium, which can be cured by irradiation with an energy beam, in order to improve the light transmittance in a transparent state and improve the vividness in a colored state. Conditions for causing the light control film to exhibit a light control performance are not particularly limited. Usually, the power supply to be used is an alternating current power supply, and the light control film can be caused to act at 10 to 220 volts (effective value) and a frequency of 30 Hz to 500 kHz.

The light control film of the present invention can be preferably used in articles such as an indoor or outdoor partition, a window pane/skylight for building, various flat display elements used in the electronic industry and imaging instruments, various gauge boards, alternate products of the existing liquid crystal display elements, a light shutter, various display plates for indoor or outdoor advertisement and guide, window panes for aircrafts/railway vehicles/ships, window panes/back mirrors/sunroofs for automobiles, eyeglasses, sunglasses, sun visors, and others.

The using method thereof may be direct use of the light control film of the present invention. For example, the light control film of the present invention may be used in the state that the film is sandwiched between two substrates, or in the state that the film is caused to adhere onto a single surface of a substrate, dependently on an article where the film is used. The substrate may be, for example, a glass or a polymeric film besides the above-mentioned transparent substrate.

With reference to the drawings, the structure and the action of the light control film according to the present invention will be described in more detail.

FIG. 1 is a schematic structural view of a light control film of an embodiment of the present invention. A light control layer 1 is sandwiched between two transparent electroconductive substrates 4 each made of a transparent substrate 6 coated with a transparent electroconductive film 5. By the changeover of a switch 8, a power supply 7 is connected or disconnected to the two transparent electroconductive films 5. The light control layer 1 is composed of a film-form resin matrix 2 obtained by curing a polymeric medium which is curable by irradiation with an energy beam, and a liquid light control suspension dispersed in the form of droplets 3 in the resin matrix 2.

Figure 2:
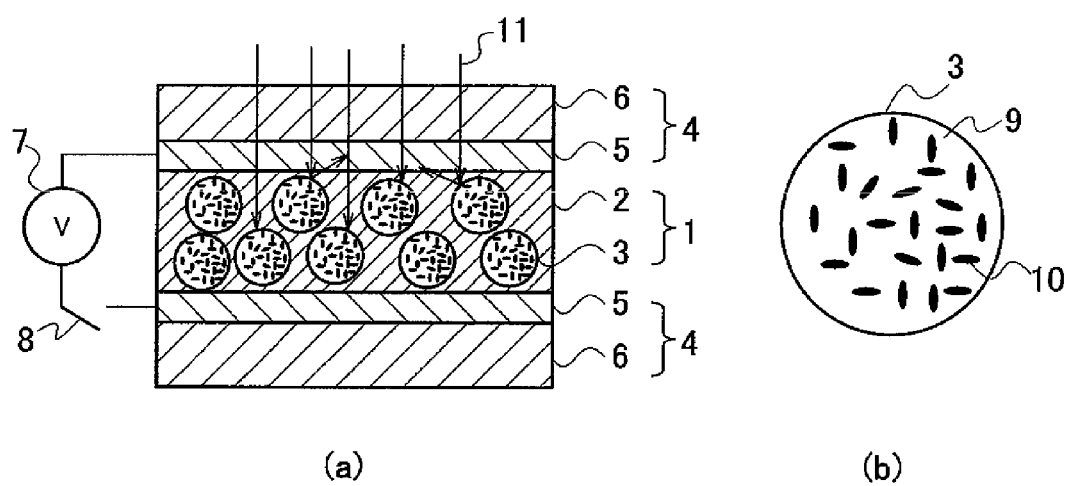
FIG. 2 are each a schematic view which is referred to in order to describe the action of the light control film in FIG. 1 when no electric field is applied thereto.
Figure 3:
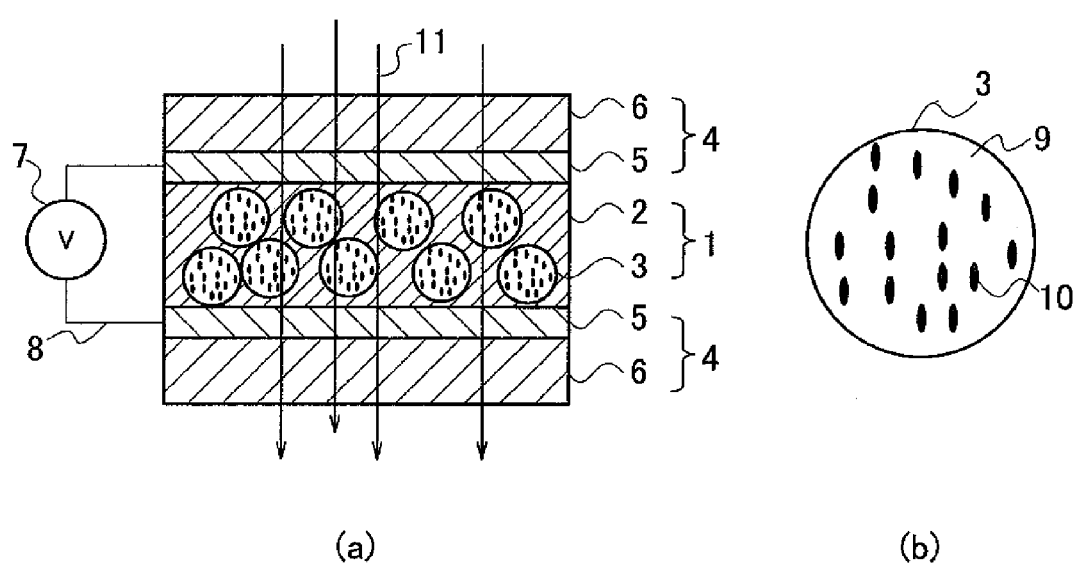
FIG. 3 are each a schematic view which is referred to in order to describe the action of the light control film in FIG. 1 when an electric field is applied thereto.

FIG. 2 is a view referred to in order to describe the action of the light control film illustrated in FIG. 1, and illustrates a case where the switch 8 is turned off so that no electric filed is applied. In this case, by Brownian motion of light control particles 10 dispersed in a dispersing medium 9 constituting the droplets 3 of the liquid light control suspension, incident light 11 is absorbed in the light control particles 10, scattered or reflected thereon, so that the incident light 11 cannot penetrate. However, when the switch 8 is turned on to apply an electric field as illustrated in FIG. 3, the light control particles 10 are arranged in parallel to an electric field generated by the applied electric field, so that the incident light 11 passes between the arranged light control particles 10. In this way, light-transmitting function which neither causes a fall in scattering property nor a fall in transparency is given to the light control film.

Figure 4:
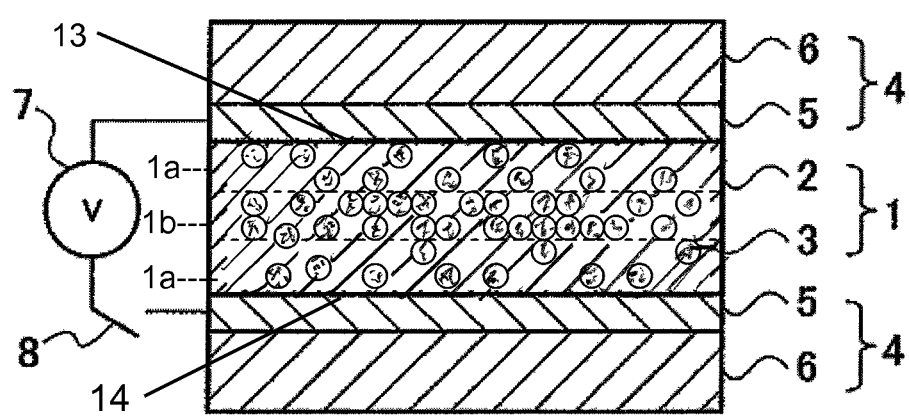
FIG. 4 is a schematic view of a sectional structure of an embodiment of the light control film in order to describe the measurement of the concentration (density) of the light control suspension by observing a cross section in the thickness direction of the light control film, trisecting the light control layer into three equal parts.

As shown in FIG. 4, the concentration of the light control suspension 3 in the vicinity of each of the transparent electroconductive substrates 4 smaller than that of the light control suspension 3 in the middle in the thickness direction of the light control layer 1. The measurement of the concentration (density) of the light control suspension 3 can be made by observing a cross section in the thickness direction of the light control film 1, trisecting the light control layer into three equal parts consisting of the vicinity region 1a of each of the transparent electroconductive substrates 4, and the middle region 1b of the light control layer 1, and then observing the existence of droplets 3 of the light control suspension in each of the regions.

As further shown in FIG. 4, the light control layer 1 having the resin matrix 2 is made by curing a polymeric medium having a first major surface 13 adjacent one of the two transparent electroconductive substrates 4 and a second major surface 14 adjacent another of the two transparent electroconductive substrates 4, and the concentration of the light control suspension 3 in the vicinity region 1a of each of the transparent electroconductive substrates is made smaller than that of the light control suspension 3 in the middle region 1b in the thickness direction of the light control layer 1 by radiating an energy beam to cure the polymeric medium from each of both the first major surface 13 and the second major surface 14 of the polymeric medium of which the resin matrix 2 of the light control layer 1 is made.

According to the present invention, a light control film can be obtained which has no color unevenness, gives a low haze, and is excellent in adhesiveness and thermal stability.

EXAMPLES

Hereinafter, the present invention will be more specifically described by way of Examples of the present invention and comparative examples.

(Production Example 1 of Light Control Particles)

In order to produce light control particles, in a 500-mL four-necked flask equipped with a stirrer and a cooling tube, 4.5 g of iodine (JIS extra pure reagent, manufactured by Wako Pure Chemical Industries, Ltd.) was dissolved in a solution composed of 87.54 g of a 15% by weight solution of nitrocellulose ¼ LIG ((trade name) manufactured by Bergerac NC Co.), which was diluted with isoamyl acetate (extra pure reagent, manufactured by Wako Pure Chemical Industries, Ltd.), 44.96 g of isoamyl acetate, 4.5 g of dehydrated $CaI_2$ (water content: 0.3%) (for chemistry, manufactured by Wako Pure Chemical Industries, Ltd.), 2.0 g of anhydrous methanol (for organic synthesis, manufactured by Wako Pure Chemical Industries, Ltd.), and 0.50 g of purified water (purified water, manufactured by Wako Pure Chemical Industries, Ltd.), and then thereto was added 3 g of pyrazine-2,5-dicarboxylic acid dihydrate (manufactured by Hitachi Chemical Techno Service Co., Ltd.), which is a base-forming material of light control particles. The solution was then stirred at 45° C. for 3 hours to terminate the reaction. Thereafter, an ultrasonic disperser was used to disperse the material for 2 hours.

Next, in order to take out light control particles having predetermined sizes from the reaction solution, a centrifuge was used to separate particles. The reaction solution was centrifuged at a velocity of 750 G for 10 minutes to remove a precipitation, and further centrifuged at 7390 G for 2 hours to remove a floating material. In this way, precipitation particles were collected, and used as light control particles. The light control particles had a major axis of 340 nm, a minor axis of 41 nm, and an aspect ratio of 8.3. The major axis, the minor axis and the aspect ratio of the light control particles were calculated out by methods described below.

[Method for Measuring Aspect Ratio]

Into a polymeric bottle were put 5 mL of isopentyl acetate and 0.1 mL of a liquid dispersion of the light control particles (liquid dispersion wherein 9 g of the light control particles were dispersed in 88 g of isoamyl acetate), and then the particles were dispersed by ultrasonic waves for 5 minutes. Thereafter, an aluminum piece, 5×10 mm, was immersed in the liquid for 10 seconds while dispersion by ultrasonic waves was performed. In this way, the aluminum piece was coated with the light control particles, and the piece was taken out and then subjected to air-drying. A surface of the aluminum piece coated with the light control particles was photographed with a scanning electron microscope, and 50 particles out of the light control particles were extracted arbitrarily from the photographed image. The major axis and the minor axis of each of the light control particles were measured, and then the aspect ratio was calculated out from the average of the values of (the major axis/the minor axis).

(Production Example of Ultraviolet Curing Silicone Resin)

Into a four-necked flask equipped with a Dean-Stark trap, a cooling tube, a stirrer, and a heater were charged 11.75 g of silanol-both-terminated polydimethylsiloxane (manufactured by Shin-Etsu Chemical Co., Ltd.), 31 g of silanol-both-terminated polydimethyldiphenylsiloxane (manufactured by Shin-Etsu Chemical Co., Ltd.), 4 g of (3-acryloxypropyl)methyldimethoxysilane (manufactured by Shin-Etsu Chemical Co., Ltd.), and 0.6 g of tin 2-ethylhexane (manufactured by Wako Pure Chemical Industries, Ltd.), and then the solution was refluxed in heptane at 100° C. for 3 hours to conduct reaction.

Next, to the reaction solution was added 10.6 g of trimethylethoxysilane (manufactured by Shin-Etsu Chemical Co., Ltd.), and the solution was then refluxed for 2 hours to conduct dealcolization reaction. Thereafter, a rotary evaporator was used to remove heptane under a reduced pressure, i.e., in a vacuum of 60 Pa pressure at 80° C. for 3 hours to yield an ultraviolet curing silicone resin (silicone resin having a substituent having an ethylenically unsaturated bond) having a weight-average molecular weight of 40,000 and a refractive index of 1.468.

(Production Example of Light Control Suspension)

97 g of a dispersion of the light control particles yielded (in Production Example of Light Control Particles) in isoamyl acetate (dispersion wherein 9 g of the light control particles was dispersed in 88 g of isoamyl acetate) was added to 59 g of a copolymer of a butyl acrylate (Wako extra pure, manufactured by Wako Pure Chemical Industries, Ltd.)/2,2,2-trifluoroethyl methacrylate (for industry, manufactured by Kyoeisha Chemical Co., Ltd.)/2-hydroxyethyl acrylate (Wako first class, manufactured by Wako Pure Chemical Industries, Ltd.) (ratio by mole between the monomers: 18/1.5/0.5, weight-average molecular weight: 2,200, refractive index: 1.468) as a dispersing medium of light control suspension. A stirrer was used to mix the components for 30 minutes to yield a mixed solution. Next, a rotary evaporator was used to attain pressure-reduction in a vacuum of 60 Pa pressure at 80° C. for 3 hours to remove isoamyl acetate from the mixed liquid. Thereto were then added 29.5 g of decyl trimellitate (manufactured by Kao Corp.) and dimethyl dodecasuberate (manufactured by Exfluor Co.) to produce a stable liquid light control suspension, wherein particle sedimentation and aggregation phenomena were not caused.

Example 1

Into 10 g of the ultraviolet curing silicone resin yielded (in Production Example of Ultraviolet Curing Silicone Resin), 0.2 g of bis(2,4,6-trimethylbenzoyl)phenylphosphine oxide (manufactured by Ciba Specialty Chemicals Inc.) as a photopolymerization initiator and 0.3 g of dibutyltin dilaurate as a coloring preventive was added 2.5 g of the light control suspension yielded (in Production Example of Light Control Suspension) to mix the components mechanically for 1 minute. In this way, a light control material was produced.

An automatic painting machine was used to pull out a polyethylene terephthalate film (trade name: 300R, manufactured by Toyobo Co., Ltd., thickness: 125 μm) having a surface electric resistance of 200 to 300 Ω/Sq and coated with a transparent electroconductive film (thickness: 300 Å) made of ITO (indium tin oxide) from a roll, and apply the above-mentioned light control material onto the film at a applying rate of 2 m/minute so as to give a dry thickness of 45 μm. Thereafter, the same polyethylene terephthalate film as described above was laminated onto the applied layer. A metal halide lamp, the illuminance of which was adjusted to 275 mW/cm$^2$, was used to radiate ultraviolet rays having a cumulative light dose of 2000 mJ/cm$^2$ (measurement: UV Power Pack S/N 8601UV-A (320-390 nm) manufactured by Fusion) onto the film lamination from top side and down side of the lamination (from both surfaces thereof), so as to produce a light control film having a light control layer wherein the light control suspension was dispersed in the form of spherical droplets in the UV-cured silicone resin. A cross section in the thickness direction of the light control film yielded in Example 1 was observed with an optical microscope. As a result, the concentration of the light control suspension dispersed in the vicinity of each of the two transparent electroconductive substrates was smaller than that of the light control suspension dispersed in the middle of the cross section of the light control layer.

Example 2

The same production as in Example 1 was conducted except that the dry film thickness was changed to 84 μm. A cross section in the thickness direction of the light control film yielded in Example 2 was observed with an optical microscope. As a result, the concentration of the light control suspension dispersed in the vicinity of each of the two transparent electroconductive substrates was smaller than that of the light control suspension dispersed in the middle of the cross section of the light control layer.

Comparative Example 1

The same production as in Example 1 was conducted except that the ultraviolet radiation was changed to ultraviolet radiation only from the upper laminated film. A cross section in the thickness direction of the light control film yielded in Comparative Example 1 was observed with an optical microscope. As a result, the concentration of the light control suspension dispersed in the vicinity of the transparent electroconductive substrate on the side opposite to the ultraviolet ray radiated surface was large.

In accordance with evaluating methods described below, the resultant light control films were evaluated. The results are shown in Table 1 and Table 2.

[Color Unevenness]

About each of the light control films yielded in the Examples and the comparative example, the evenness (light and shade) of the concentration when no electric field was applied was observed on an inspection plate with the naked eye.

A: Color was even

B: Color was uneven in the whole

[Adhesiveness (Difficulty in Peeling)]

A piece, 30×150 mm, was produced from each of the light control films yielded in the Examples and the comparative example. The transparent electroconductive substrates in 50-mm end regions in the longitudinal direction were cut away alternately in the upward and downward directions. The light control layer regions naked in both of the end regions were wiped away. The resultant was used as a test piece. In the test, a 100-kg autograph was used to pull the test piece at a test speed of 50 mm/min in the longitudinal direction. In this way, the breaking load was measured. The measurement was divided by the adhesion area of 15 cm$^2$ (30×50 mm). The resultant value was defined as the adhesion stress.

A: Cohesive failure of the light control layer

B: Peeling in the interfacial surface between the substrates and the light control layer

[Light Transmittance]

About each of the light control films yielded in the Examples and the comparative example, the following were measured: the light transmittance when no electric field was applied thereto; and the light transmittance when an electric field having an alternating voltage (effective value) of 100 V, the frequency thereof being 400 Hz, was applied thereto. The light transmittance of the light control film was the Y value (%) obtained by measuring the film with a spectroscopic color-difference meter (SZ-Σ90, manufactured by Nippon Denshoku Industries Co., Ltd.) at a visual field angle of 2 degrees, using an A light source. Additionally, the light transmittance when no electric field was applied was subtracted from the light transmittance when the electric field was applied, thereby calculating the contrast.

The haze was measured by use of a haze meter (Color And Difference Meter Model 1001DP, manufactured by Nippon Denshoku Industries Co., Ltd.) when no electric field was applied and when an electric field having an alternating voltage (effective value) of 100 V, the frequency thereof being 400 Hz, was applied.

TABLE 1

| Items | Color unevenness | Adhesiveness KPa | Transmittance (%) (when no voltage was applied) | Transmittance (%) (when voltage was applied) | Contrast | Haze (when no voltage was applied) | Haze (when voltage was applied) |
|---|---|---|---|---|---|---|---|
| Example 1 | A | A80 | 6.3 | 66.4 | 60.1 | 27.5 | 3 |
| Example 2 | A | A90 | 0.6 | 50.1 | 49.5 | 44.6 | 4.9 |
| Comparative Example 1 | B | B30 | 6.2 | 41.8 | 35.6 | 38.4 | 10 |

About Examples 1 and 2, wherein the concentration of the light control suspension dispersed in the vicinity of each of the two transparent electroconductive substrates of the light control film was smaller than that of the light control suspension dispersed in the middle of the cross section of the light control layer, a large contrast was exhibited as a light control film, and further the haze was low and the adhesiveness (difficulty in peeling) to the transparent electroconductive substrates was improved. About each of the light control films yielded in the Examples and the comparative example, a cross section in the thickness direction thereof was checked with an optical microscope through a 200-power visual field. As a result, no interfacial surface was present in the light control layer.

The invention claimed is:

1. A light control film, comprising:
two transparent electroconductive substrates; and
a light control layer sandwiched between the two transparent electroconductive substrates,
wherein the light control layer contains a resin matrix and a light control suspension dispersed in the resin matrix as droplets having light control performance, where the light control suspension comprises a liquid dispersing medium and light control particles having a major axis and a minor axis dispersed in the liquid dispersing medium, where a concentration of the light control suspension, measured by observing a cross section in a thickness direction of the light control film when trisecting the light control layer into three equal thickness parts consisting of a vicinity region to each of the transparent electroconductive substrates, and a middle region of the light control layer to observe the existence of droplets of the light control suspension in each of the regions, in the vicinity region to each of the transparent electroconductive substrates is smaller than that of the light control suspension in the middle region in the thickness direction of the light control layer, and the light control particles are configured to have their major axes arranged in a direction parallel to an electric field when an electric field is applied, whereby light radiated into the light control film penetrates through the light control film, wherein the light control layer contains the resin matrix as an energy cured polymeric medium from each of both major surfaces, where the polymeric medium has a first major surface adjacent one of the two transparent electroconductive substrates and a second major surface adjacent another of the two transparent electroconductive substrates with the light control suspension dispersed in the polymeric medium as droplets, so that for the resin matrix the concentration of the light control suspension in the vicinity region to each of the transparent electroconductive substrates is smaller than that of the light control suspension in the middle region in the thickness direction of the light control layer for color evenness and adhesion with the two transparent electro-conductive substrates.

2. The light control film according to claim 1, wherein the resin matrix has therein no interfacial surface.

3. The light control film according to claim 1, wherein the resin matrix is formed from a polymeric medium comprising:
a silicone resin having a substituent having an ethylenically unsaturated bond; and
a photopolymerization initiator.

4. The light control film according to claim 1, wherein the light control suspension contains an acrylic acid ester oligomer having a fluoro group and a hydroxyl group.

5. The light control film according to claim 1, wherein an aspect ratio of the major axis to the minor axis of the light control particles is from 6 to 15.

6. The light control film according to claim 1, wherein an aspect ratio of the major axis to the minor axis of the light control particles is from 7 and 12.

7. The light control film according to claim 1, wherein an aspect ratio of the major axis to the minor axis of the light control particles is from 7.5 to 11.

8. The light control film according to claim 1, wherein the light control suspension contains the light control particles in an amount of 1 to 70% by weight of the light control suspension.

9. The light control film according to claim 1, wherein the light control suspension contains the light control particles in an amount of 4 to 50% by weight of the light control suspension.

10. The light control film according to claim 1, wherein the light control suspension contains the liquid dispersing medium in an amount of 30 to 99% by weight of the light control suspension.

11. The light control film according to claim 1, wherein the light control suspension contains the liquid dispersing medium in an amount of 50 to 96% by weight of the light control suspension.

12. The light control film according to claim 1, wherein the light control suspension is contained in the resin matrix in an amount of 1 to 100 parts by weight relative to 100 parts by weight of the resin matrix.

13. The light control film according to claim 1, wherein the light control suspension is contained in the resin matrix in an amount of 4 to 70 parts by weight relative to 100 parts by weight of the resin matrix.

14. The light control film according to claim 1, wherein the light control suspension is contained in the resin matrix in an amount of 6 to 60 parts by weight relative to 100 parts by weight of the resin matrix.

15. The light control film according to claim 1, wherein the light control suspension is contained in the resin matrix in an amount of 8 to 50 parts by weight relative to 100 parts by weight of the resin matrix.

16. The light control film according to claim 1, wherein the thickness of the light control layer is from 10 to 500 µm.

17. The light control film according to claim 1, wherein the thickness of the light control layer is from 20 to 100 µm.

18. The light control film according to claim 1, wherein each of the transparent electroconductive substrates comprises a transparent substrate with a transparent electroconductive film provided thereon, the transparent electroconductive film provided on each of the transparent electroconductive substrates being provided on a side of each transparent substrate adjacent the light control layer.

* * * * *